Figure 1:
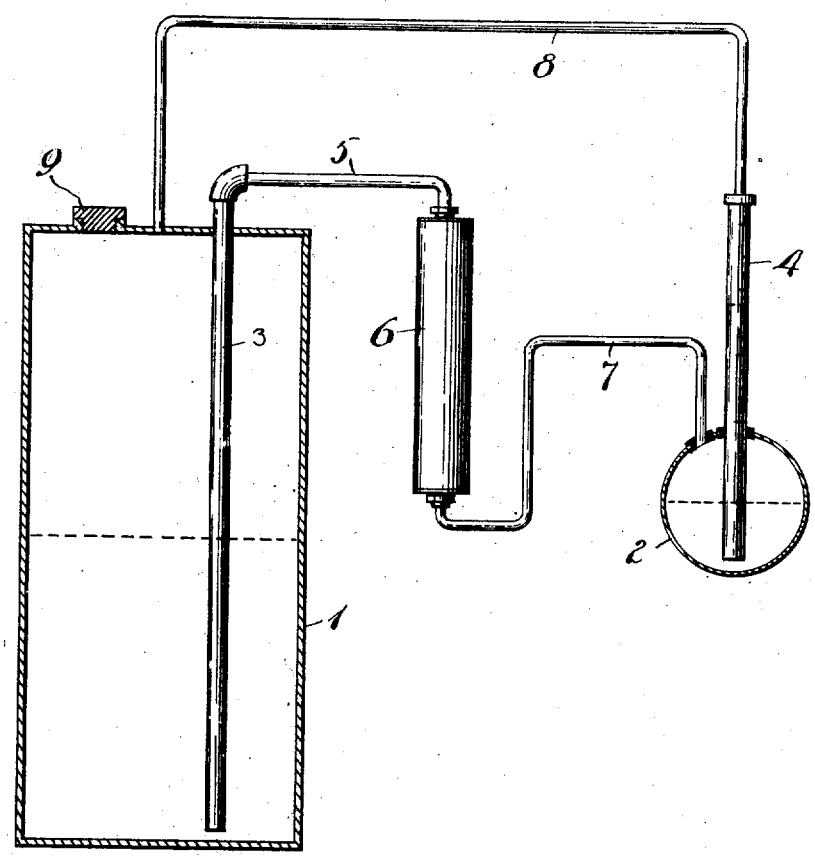

No. 859,921. PATENTED JULY 16, 1907.
C. CUNO.
GAGE FOR INDICATING LIQUID LEVELS.
APPLICATION FILED APR. 5, 1907.

2 SHEETS—SHEET 1.

Witnesses:

Inventor
CHARLES CUNO
By his Attorneys

No. 859,921. PATENTED JULY 16, 1907.
C. CUNO.
GAGE FOR INDICATING LIQUID LEVELS.
APPLICATION FILED APR. 5, 1907.
2 SHEETS—SHEET 2.
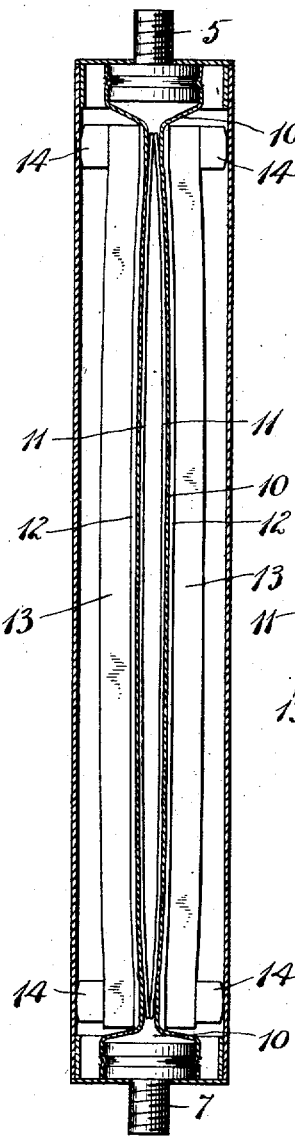
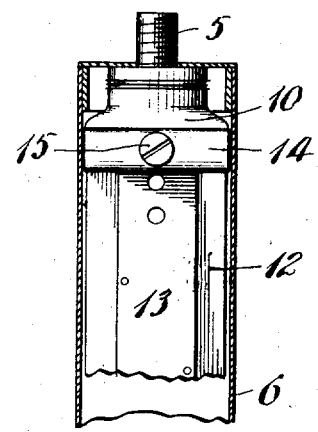
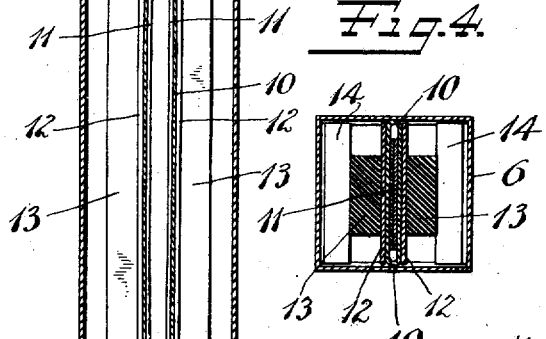
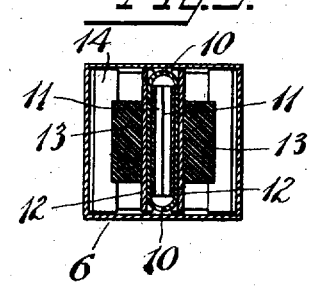
Witnesses:
Inventor
CHARLES CUNO
By Attorneys

UNITED STATES PATENT OFFICE.

CHARLES CUNO, OF MERIDEN, CONNECTICUT.

GAGE FOR INDICATING LIQUID-LEVELS.

No. 859,921.　　　Specification of Letters Patent.　　　Patented July 16, 1907.

Application filed April 5, 1907. Serial No. 366,605.

*To all whom it may concern:*

Be it known that I, CHARLES CUNO, a citizen of the United States, residing at Meriden, county of New Haven, Connecticut, have invented certain new and useful Improvements in Gages for Indicating Liquid-Levels, of which the following is a full, clear, and exact description.

My invention relates to an improved gage for registering liquid levels, the invention being of particular utility in connection with liquid fuel tanks for use in automobiles, the indicator proper being so placed as to always be in sight to the driver who may, at any moment, ascertain the quantity of fuel remaining in the storage reservoir.

Broadly speaking, the invention comprehends among the essential elements, a storage tank, a receptacle having a gage tube therein, and a liquid in said latter receptacle which preferably is anti-freezing and harmless. Between this tank and the receptacle is an air duct, and in said air duct is an equalizing device arranged to compensate for variations in temperature, so that under all conditions and in all seasons, the gage will register accurately. The indicating fluid is acted upon by the pressure of the air from the tank. As the liquid in the storage tank varies in level, the air displacement therein also varies. This is utilized to vary the displacement of the liquid in the receptacle, so that it will rise or fall in the gage tube to indicate correctly the level in the tank. Since a rise of 100° Fahrenheit will produce an expansion of air of substantially twenty-three per cent., it follows that the indicator will not register accurately under all conditions without a suitable compensating device is employed to allow for this change by expansion. To that end, my invention always includes, at a suitable point in the air system or duct, a compensating device which will correct this change by expansion automatically, thus correcting what would otherwise be a fatal defect.

In the accompanying drawings—Figure 1 is a diagrammatic view of my invention; Fig. 2 is a vertical, sectional, relatively enlarged view in elevation of the compensator; Fig. 3 is a sectional view taken at right angles to the plane of Fig. 2 of the same parts; Figs. 4 and 5 are similar sectional views, showing the internal parts in a slightly different position respectively.

1 is a storage tank for containing the liquid.

2 is the indicator receptacle, also containing fluid, preferably of a non-freezing, harmless nature.

3 is a pipe extending from the outside of tank 1, into the same and well toward the bottom.

4 is an indicator tube, preferably transparent and suitably graduated, although the graduations are of minor importance. This tube 4 extends from the outside of the receptacle 2, into the same and well toward the bottom thereof.

5 is a tube connected at one end of what I term the temperature controlled compensator 6.

7 is a pipe leading from the compensator 6 to the upper part of the receptacle 2, by preference. Suitable connections will be, of course, provided to make the several joints air-tight.

8 is a pipe leading from the upper end of tube 4 back to the receptacle 1.

9 is a stopper for filling opening in tank 1. The tubes 7 and 8 are preferably of very much smaller cross-sectional area than the tube 3. The tube 4 is also preferably slightly larger in cross-sectional area than tube 3, and preferably larger than tube 7.

Broadly, the operation of the apparatus is as follows: Assuming the tank 1 is empty, the receptacle 2 will contain a fluid that will substantially fill the same and not project into the exposed portion of the graduated tube 4, or at least not above that point therein wherein its presence indicates that the tank 1 is empty. As tank 1 is filled and the liquid level therein raised, air in the tube 3 will be displaced and forced through pipe 5, temperature controlled compensator 6, pipe 7, into receptacle 2. As the volume of air increases in receptacle 2, the liquid therein will be forced up into the tube 4. When this tube 4 is half full it will indicate that the tank 1 is half full, and when full it will indicate that the tank 1 is also full. In order to permit the tube 4 to be made very short and compact, the cross-sectional capacity of the same should be enlarged relatively to the cross-sectional capacity of tube 3, as will be seen, suitable allowance, of course, being made for the slight compression in air that may occur. During changes in temperature the volume of air in the air-pipe system and above the liquid levels in both receptacles, would vary considerably, in fact, to such a degree as to render the indicator useless, were it not for the provision of the compensating device 6, which provides a collapsible and expansible chamber automatically operating with variations in temperature to care for these changes in air volume due to changes in temperature.

The preferable construction of the compensator is as follows, reference being had to Figs. 2, 3, 4 and 5: 6 is the exterior wall of the compensator, as before. 10 is a collapsible expansion chamber of suitable material, for example, rubber. This chamber, preferably tubular in form, is connected at opposite ends to the incoming and outgoing ends of the air pipes 5 and 7, respectively. The cross-sectional capacity of the chamber 10 is preferably greater than the cross-sectional capacity of air pipes 5 and 7. Within the expansion chamber 10 are two spring expander plates 11—11 which separate the walls of the tube and tend to push them apart. These spacer plates, as I term them, not only prevent the walls of the expansion chamber from adhering, but likewise serve to open or expand the same to increase the volumetric capacity. 12—12 are outside presser plates, preferably provided on opposite sides of the expansion chamber 10. Riveted or suitably fastened to the back of these plates 12 are strips 13—13. The plates 12—12 are preferably metal, while the strips 13—13 are preferably hard rubber, or similar material, which has a co-efficient expansion substantially different from the material of the plates 12—12. At or near the opposite end of each of the strips 13—13 are bearings 14—14. These bearings may be secured by a screw 15 (as shown in Fig. 3) and may be adjusted up and down for the purpose hereinafter described. These bearings 14 snugly fit against the inner walls of the casing 6, and, as will be seen, the upper and lower ends of the expansion chamber 10 are substantially closed, save at the edges of the spring expander plates 11—11. The passage through the expansion chamber is never, of course, entirely closed but the internal capacity of the same is varied automatically by the bowing of the plates 12—12. As the temperature lowers, the strips 12—13 will tend to straighten out, thus collapsing the expansion chamber and reducing the internal capacity of the same. In the same way, when the temperature rises, the plates 12—13 will tend to bow outwardly and the expander springs 11—11 will open the expansion chamber 10, increasing its internal capacity. This bowing of the strips 12—13 is the result of the difference in the co-efficient of expansion, rubber, for example, expanding much more rapidly than steel, hence, since said strips 12—13 are riveted together, the above bowing effect is bound to result from changes in temperature. In Fig. 4 I have shown the expansion chamber collapsed, as it would be during cold weather, this section being taken approximately midway between the ends of the compensator. In Fig. 5 I have shown the expansion chamber 10 as opened up, as it would appear in hot weather, to compensate for the expansion of air. The effective part of the compensating strips 12—13 lies between the fulcrums or bearings 14 at opposite ends. It is, therefore, merely necessary to vary the position of said bearings, moving them nearer together or farther apart, to get an effective adjustment.

This indicator is equally adapted for tanks in which a pressure of air is provided above the liquid in the storage tank. If atmospheric pressure only is employed, the tube 8 may be dispensed with, in which event a suitable vent would be provided in the tank 1, for example, by merely boring a small hole in the stopper 9. If a higher pressure is employed in tank 1, such pressure will be balanced on the liquid level in receptacle 2 and pipe 4 by reason of the pipe 8, so that no liquid will be forced through pipes 3, 5 and 7 into the receptacle 2, containing the indicator fluid.

What I claim is—

1. In a liquid level indicating device, a storage tank, a tube projecting into the same and well towards the bottom thereof, a receptacle, an indicator tube projecting therefrom and well towards the bottom of the same, an air-pipe connecting the aforesaid tubes, and a temperature controlled compensator in said air-pipe.

2. In a liquid level indicating gage, a storage tank, a receptacle for containing an indicating fluid, and indicator tube projecting into said receptacle at a point below the liquid level therein, an air connection between said receptacle and the interior of the tank, and a temperature controlled compensator in said air connection.

3. In an apparatus of the character described, a storage tank, a gage including a sight-glass and a receptacle for containing an indicating fluid, a pneumatic conduit between said tank and receptacle, a compensator therein comprising a collapsible chamber, and means for expanding and contracting the same, variable with changes in temperature.

4. In a liquid level indicating gage for storage tanks, a storage tank a receptacle for containing an indicating fluid, an air conduit arranged to connect the interior of said receptacle with the tank, and a temperature controlled expansion chamber in said air conduit.

5. In a liquid level indicating gage for storage tanks, a storage tank a receptacle for containing an indicating fluid, an air conduit arranged to connect the interior of said receptacle with the tank, and a temperature controlled expansion chamber in said air conduit, said compensator expansion chamber including a collapsible conduit, means for expanding the same from the inside, and means for compressing the same from the outside.

CHAS. CUNO.

Witnesses:
E. C. WILCOX,
B. C. ROGERS.